Figure 1:
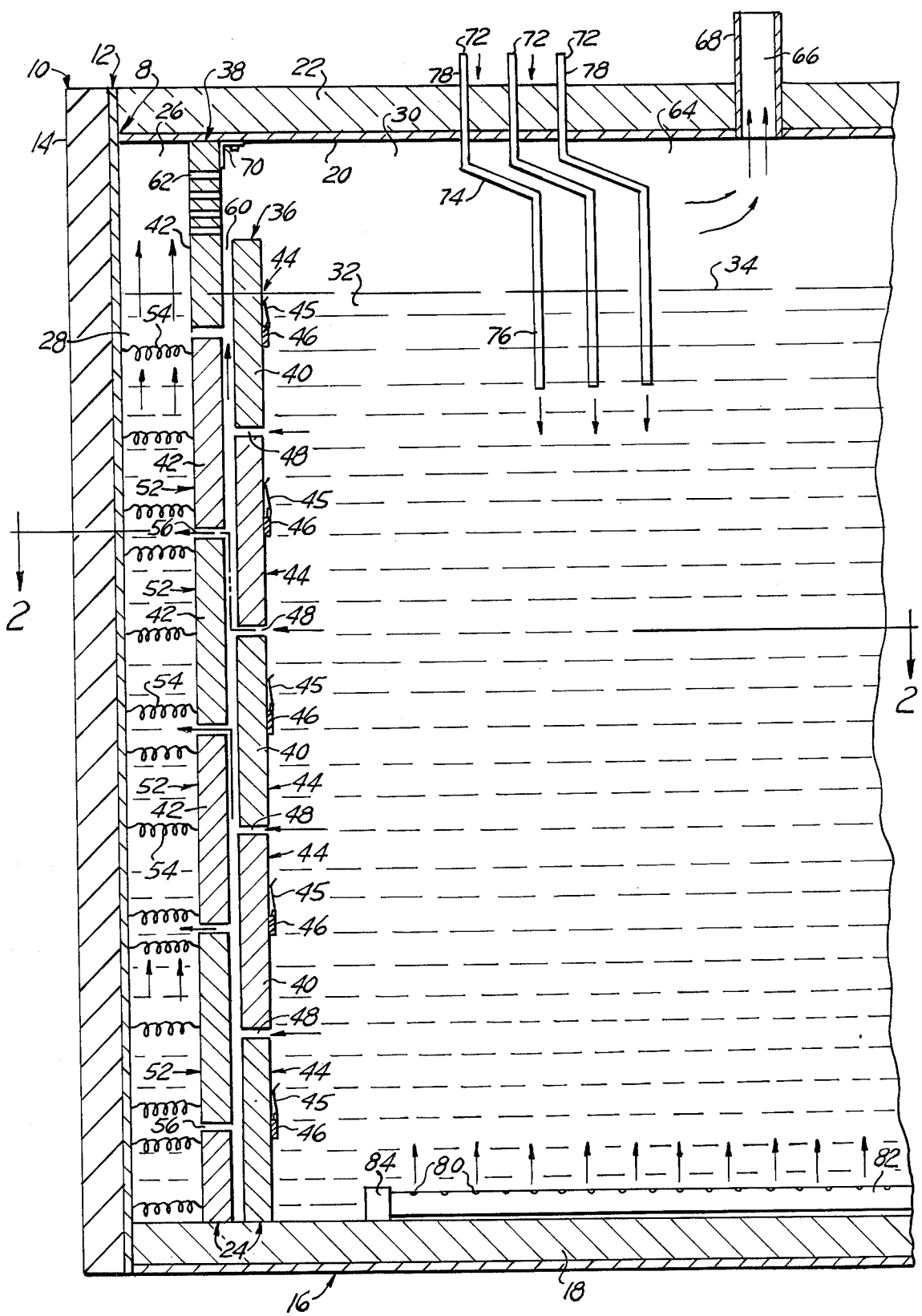

United States Patent [19]

Barthel

[11] 4,096,709

[45] Jun. 27, 1978

[54] RUPTURE-PREVENTING AIR-RELEASING WATER-FREEZING RESERVOIR

[76] Inventor: Gerhard Barthel, 14657 Juliana, East Detroit, Mich. 48021

[21] Appl. No.: 787,326

[22] Filed: Apr. 14, 1977

[51] Int. Cl.² ............................................. F25D 3/10
[52] U.S. Cl. ........................................ 62/307; 62/59; 62/430; 165/104 S; 220/901
[58] Field of Search ................... 62/59, 430, 437, 529, 62/356, 307; 165/104 S; 220/9 LG

[56] References Cited

U.S. PATENT DOCUMENTS

| 1,044,310 | 11/1912 | Walint | 62/356 |
|---|---|---|---|
| 1,576,867 | 3/1926 | Swan | 62/59 |
| 1,945,975 | 2/1934 | Munters | 62/59 |
| 3,339,779 | 9/1967 | Horton et al. | 220/9 LG |
| 3,450,194 | 6/1969 | Barthel | 165/18 |
| 3,862,700 | 1/1975 | Noma et al. | 220/9 LG |
| 3,998,071 | 12/1976 | Barthel | 62/430 |

Primary Examiner—C. J. Husar
Attorney, Agent, or Firm—Willis Bugbee

[57] ABSTRACT

To prevent the rupturing, by the expansion of the water upon freezing, of a water-freezing ice-storing reservoir and at the same time release the warmer air after producing the freezing of the water into ice, the interior of the reservoir is surrounded by a duplex wall structure or anti-freeze barrier of highly insulating material, such as the expanded polystyrene plastic known commercially as styrofoam, in the form of slabs spaced inward from the tank wall by compression springs so that the inner body of water within the duplex insulating anti-freeze barrier is frozen by freezing the air entering that body through multiple pipes from the outside atmosphere in winter time while the outer body of water adjacent the tank wall of the reservoir but outside the insulating wall thereof is protected from freezing by the insulating effect of the slabs. At the same time, the air after extending its freezing effect upon the internal body of water is permitted to escape through offset or staggered interstices between the individual slabs while freezing of the water between the slabs is prevented by the circuitous path which the escaping air is forced to follow. The outer wall of slabs at its upper end is provided with multiple ports through which the escaping air passes into the air space above the water level in the tank and then to the outside atmosphere through an outlet conduit. The outer wall of slabs is secured at its upper end to the tank ceiling, whereas the inner wall of slabs is divided into multiple tiers of slabs, the slabs of each tier being held together by tie members, such as endless metal bands, the weights of which offset the buoyancy of the slabs yet permit the slabs of each tier to float as a unit while the escaping air can force its way outward through the interstices between the slabs into and upward through the unfrozen outer body of water into the outer atmosphere.

10 Claims, 2 Drawing Figures

RUPTURE-PREVENTING AIR-RELEASING WATER-FREEZING RESERVOIR

BACKGROUND OF THE INVENTION

In U.S. Pat. Nos. 3,450,194 issued June 17, 1969 for Greenhouse Air-Cooling System and No. 3,998,071 issued Dec. 21, 1976 for Greenhouse Air-Cooling Apparatus, the present inventor has disclosed and claimed reservoirs into which freezing air in winter time is forced in order to freeze the water therein for storage and subsequent use in the following summer for cooling streams of air supplied to greenhouses to maintain the atmospheres therein at the most healthful temperatures for the efficient growing of plants.

The present invention not only provides protection for the outer wall of the reservoir tank against rupture due to the expansion of the water during its freezing into ice, but also permits ready escape of the air after it has performed its freezing function, without permitting it to be trapped below ice forming across the entire surface of the water in the upper part of the tank.

SUMMARY OF THE INVENTION

The invention primarily resides in the provision of an auxiliary insulating wall or anti-freeze barrier spaced inward from the outer wall of the reservoir tank and composed of slabs of insulating material through the interstices between which the departing air can escape after expending its freezing effect upon the body of water inside the inner auxiliary insulating wall or anti-freeze barrier, the latter of which by its insulating effect prevents the water between it and the outer wall of the tank from freezing and therefore from blocking the escape of the departing air. The invention further resides in the resilient connection consisting of compression springs between the inner auxiliary insulating wall and the outer tank wall so as to permit the water in the inner chamber to expand outward while freezing and at the same time to push the inner auxiliary insulating wall outward against the resilience of the springs while the surrounding outer body of water remains unfrozen.

Figure 2:
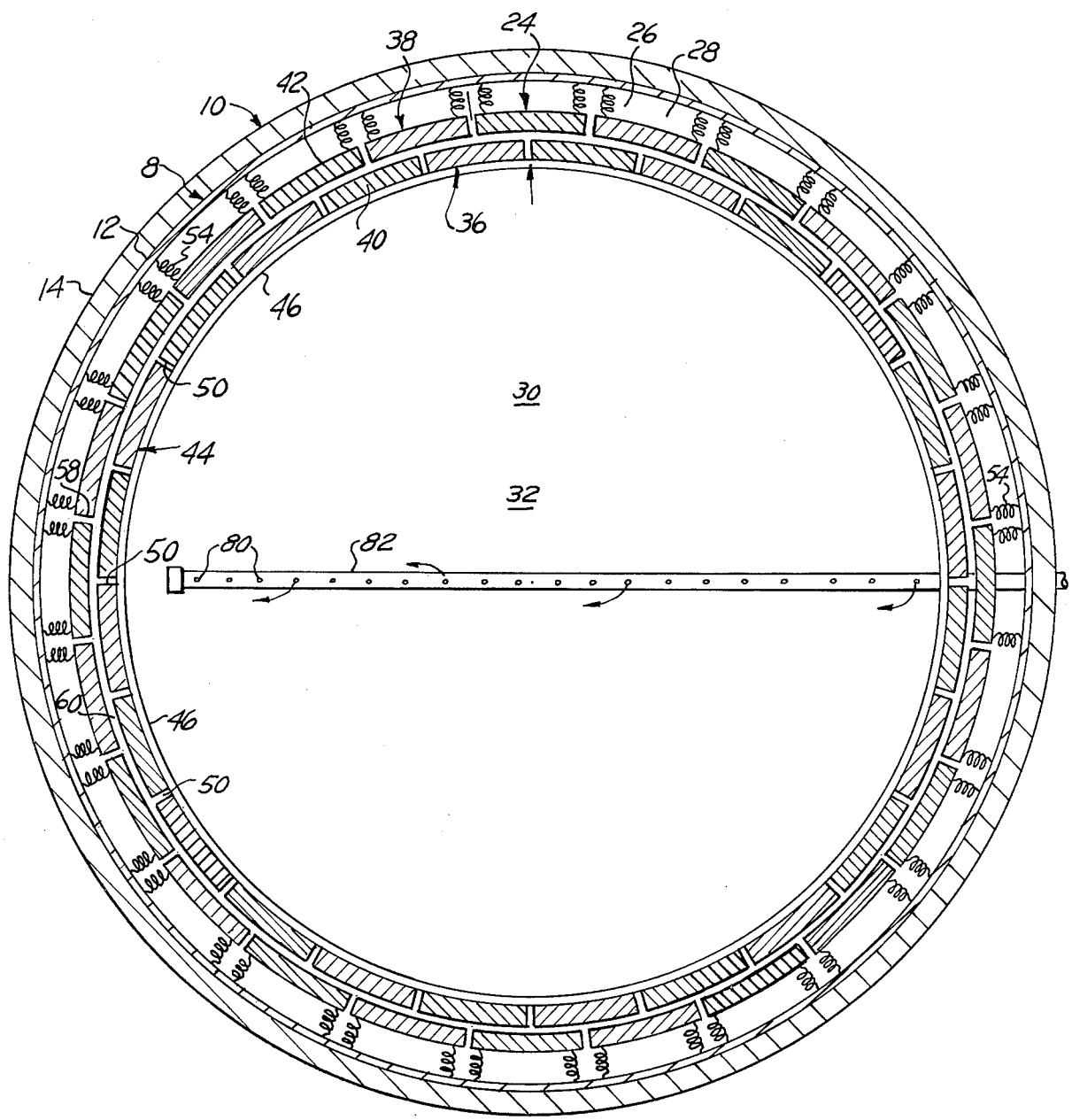

In the drawings,

FIG. 1 is a central vertical cross-section through a rupture-preventing air-releasing water-freezing ice-storing reservoir according to one form of the invention; and FIG. 2 is a generally horizontal section taken along the zigzag line 2—2 in FIG. 1.

Referring to the drawings in detail, FIGS. 1 and 2 show a rupture-preventing air-releasing water-freezing reservoir, generally designated 10, according to one form of the invention, consisting generally of a tank 8 having a tank outer wall 12 surrounded by an external insulating wall 14 and closed at the bottom by a tank bottom wall 16 within which is an insulating bottom wall 18. The tank 8 is closed at the top by a tank top wall 20 and an insulating top wall 22. A duplex expansible insulating wall or barrier 24 is spaced inward from the tank outer wall 12 to provide a peripheral chamber 26 containing an outer water body 28 surrounding the duplex expansible insulating wall or anti-freeze barrier 24 which in turn surrounds an inner freezing chamber 30 containing the inner body of water 32 to be frozen and having its upper level disposed at the surface 34 thereof.

The duplex expansible insulating wall or barrier 24 consists of an inner wall, generally designated 36, and an outer wall, generally designated 38. Each of the insulating walls 36 and 38 is composed respectively of individual inner and outer insulating slabs 40 and 42 of suitable insulating material, the expanded polystyrene material known commercially as styrofoam having been found suitable for this purpose. The inner and outer slabs 40 and 42 are of similar construction and as supplied commercially are 6 feet long, 2 feet wide and either 1 inch or 2 inches in thickness. This material does not deteriorate when submerged in water over a long period of time but is so light and of such low density that it is caused to float, hence its buoyancy must ordinarily be counteracted or the slabs held down when immersed in the tank of water.

The inner slabs 40 of the inner expansible wall 36 are disposed in separate inner tiers, each such inner tier being generally designated 44. The inner slabs 40 of each inner tier 44 are held together by and attached by short wires or other flexible connectors 45 to continuous tie members 46, such as metal bands or hoops, the weight of which also tends to counterbalance the buoyancy of the inner slabs 40 so as to hold them down. The inner slabs 40 of the inner expansible wall 36 are spaced vertically apart from one another by horizontal interstices 48 and are spaced horizontally apart from one another by vertical interstices 50. The outer slabs 42 of each outer tier, generally designated 52, are pushed inward toward the inner auxiliary slabs 40 by multiple compression coil springs 54. The outer slabs 42 are separated vertically from one another by horizontal interstices 56 and horizontally from one another by vertical interstices 58. The interstices 48 and 50 of the inner wall 36 are offset both vertically and horizontally from the horizontal and vertical interstices 56 and 58. Both walls 36 and 38 are separated from one another by a gap or space 60 which serves as a passageway interconnecting the above-named interstices 48, 50 and 56, 58. The uppermost slabs 42 of the outer wall 38 are provided with horizontal ports or passageways 62 which provide for the escape of air from the peripheral chamber 26 through the air space 64 above the water level 34 in the inner chamber 30 and thence upward through the passageway 66 in the exhaust conduit 68. The uppermost slabs 42 of the outer wall 38 are prevented from moving inward while permitted to move outward by angle brackets 70 bolted to the tank top wall 20 at intervals around the inner periphery of the outer wall 38.

Water-freezing air from the outside atmosphere in winter time is discharged into the upper portion of the inner water body 32 through multiple pipes 72 having flexible portions 74 enabling their lower portions 76 to rise or fall relatively to their upper portions 78. Air at a water-freezing temperature is similarly admitted at the bottom of the inner water body 32 through holes 80 in the horizontal pipe or series of pipes 82 having a closed inner end 84 and having its outer end or ends connected to the outlet of a motor-driven blower (not shown), the inlet of which is caused to communicate with the outside below-freezing winter atmosphere.

The operation of the greenhouse cooling system, of which the present invention forms an improved part, has been fully described as a whole in my two above-identified prior U.S. Pat. Nos. 3,450,194 and 3,998,071. In so far as the operation applies to the present invention, air at a water-freezing temperature is pumped in from the outside winter atmosphere in freezing weather through the multiple upper pipes 72 and also through the lower pipe or pipes 82. This freezing air bubbles upward through the inner body of water 32 in the inner freezing chamber 30 until the water while freezing from the upper water lever 34 downward forms ice which blocks the outlets of the pipes 72. Meanwhile, the warmer exhaust air, having absorbed heat from the inner water body 32, escapes through the interstices 48 and 50 between the slabs 40 of the inner wall 36 and up the passageway 60 when a layer of ice forms at the water level 34. It also escapes through the interstices 56 and 58 in the outer wall 38 and bubbles upward through the unfrozen outer water body 28 without freezing it and passes through the ports 62 across the portion of the chamber 30 above the water level 34, thence out into the outside atmosphere through the passageway 66 in the exhaust conduit 68.

As the water in the inner water body 32 freezes and becomes ice, it expands and pushes the tiers 44 and 52 of inner and outer insulating slabs 40 and 42 of the expansible wall 24 outward to compensate for this expansion. The slabs 40 and 42, however, are of such highly efficient insulating properties that the peripheral outer body of water 28 remains in a liquid state while the body of water 32 in the inner chamber 30 turns to ice. The circuitous paths for the escaping air resulting from the staggered or offset passageways or interstices 48, 50 and 56, 58 prevent the water from freezing and turning to ice within these passageways. The freezing of the inner water body 32 continues in this manner until the inner chamber 30 below the water level 34 becomes substantially a solid block of ice, whereupon the increasing pressure of the freezing air entering at the bottom of the tank through the pipe or pipes 82 actuates a pressure-responsive switch (not shown) which shuts off the blower (also not shown) which supplies the freezing air, as described more fully in my above-identified two patents.

I claim:

1. A wall-rupture-preventing air-releasing water-freezing reservoir, comprising
 a water-tight tank having top, bottom and side wall,
 an expansible substantially continuous heat-insulating barrier rising from said bottom wall of said tank above the water level thereof in close proximity but in spaced relationship to said side wall and defining and separating from one another an outer unfrozen-water chamber and a larger inner water-freezing chamber,
 said barrier and at least one of said tank walls having expended-air outlet passageways therethrough,
 and means for discharging into said inner chamber of said tank below the water level thereof outside atmospheric winter air at below-water-freezing temperatures.

2. A reservoir, according to claim 1, wherein said barrier includes inner and outer expansible heat-insulating walls spaced apart from one another and thereby defining a vertical expended-air outlet passageway therebetween.

3. A reservoir, according to claim 2, wherein at least one of said barrier walls is composed of multiple slabs of heat-insulating material with expended-air outlet passageways therebetween.

4. A reservoir, according to claim 2, wherein both of said barrier walls are composed of multiple separate slabs of heat-insulating material with expended-air outlet passageways therebetween.

5. A reservoir, according to claim 3, wherein tie members interconnect said multiple separate slabs.

6. A reservoir, according to claim 5, wherein yieldable connectors interconnect said multiple separate slabs and said tie members.

7. A reservoir, according to claim 2, wherein resilient elements connect said outer wall of said barrier to said side wall of said tank.

8. A reservoir, according to claim 2, wherein said outer wall of said barrier is higher than said inner wall thereof.

9. A reservoir, according to claim 4, wherein said expended-air outlet passageways of said outer barrier wall are offset relatively to said extended-air outlet passageways of said inner barrier wall whereby to cooperate with said vertical expended-air outlet passageway to effect circuitous path of flow of said expended air.

10. A reservoir, according to claim 1, wherein heat-insulating walls are disposed adjacent said tank walls.

* * * * *